United States Patent
Ebert et al.

(10) Patent No.: US 12,544,924 B1
(45) Date of Patent: Feb. 10, 2026

(54) SYSTEM TO SCHEDULE AUTONOMOUS MOBILE DEVICE TASKS

(71) Applicant: AMAZON TECHNOLOGIES, INC., Seattle, WA (US)

(72) Inventors: Robert Franklin Ebert, Los Altos Hills, CA (US); Chandra Mohan Krishnamurthy, San Jose, CA (US); Hani Abdo, Sunnyvale, CA (US); Arkojit Ghosh, Mountainview, CA (US); Sandeep Samdaria, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 440 days.

(21) Appl. No.: 18/162,405

(22) Filed: Jan. 31, 2023

(51) Int. Cl.
| | |
|---|---|
| *B25J 9/16* | (2006.01) |
| *B25J 9/00* | (2006.01) |
| *G05D 1/00* | (2024.01) |

(52) U.S. Cl.
CPC ........... *B25J 9/1661* (2013.01); *B25J 9/0003* (2013.01); *G05D 1/0088* (2013.01)

(58) Field of Classification Search
CPC .............................. B25J 9/0003; B25J 9/1661
See application file for complete search history.

(56) References Cited

U.S. PATENT DOCUMENTS

| | | | |
|---|---|---|---|
| 10,012,996 B1* | 7/2018 | Canoso ................ | G05D 1/0231 |
| 2004/0024490 A1* | 2/2004 | McLurkin ............ | G05D 1/0297 |
| | | | 700/245 |
| 2005/0256610 A1* | 11/2005 | Orita ..................... | G05D 1/027 |
| | | | 700/248 |
| 2018/0257228 A1* | 9/2018 | Tingler ................. | B25J 9/1669 |
| 2018/0284760 A1* | 10/2018 | Gupta ................... | G06F 3/011 |
| 2018/0326583 A1* | 11/2018 | Baroudi ................ | B25J 9/1661 |

* cited by examiner

*Primary Examiner* — Khoi H Tran
*Assistant Examiner* — Tristan J Greiner
(74) *Attorney, Agent, or Firm* — Lindauer Law, PLLC

(57) ABSTRACT

An autonomous mobile device (AMD) performs operations associated with task requests received from sources such as user input, internal or external processes, and so forth. A task request may comprise adaptive and non-adaptive conditions. Adaptive conditions may be satisfied by operation of the AMD, such as finding a particular person or moving to a particular location. Non-adaptive conditions are satisfied without operation by the AMD. A task request may be selected for execution when a current state of the AMD corresponds to conditions specified by the task request. Metatask(s) associated with a task request may be determined. For example, a task request that involves interacting with a particular person has a metatask of finding that particular person. A task request for which all conditions are satisfied may be enqueued for execution. A metatask associated with a task request that has its non-adaptive conditions satisfied may be enqueued for execution.

20 Claims, 8 Drawing Sheets

TASK DATA 144

| PARAMETER 404 | VALUE 406 |
|---|---|
| Task Identifier | {taskID} |
| Originator | {sourceprocess} |
| Duration | {duration} |
| Originator Priority | {org_priority} |
| Condition Data | {conditiondata} |
| Operation Data | {operationdata} |

...

STATE DATA 146

| STATE 414 | VALUE 416 |
|---|---|
| Current date/time | {time} |
| Current Pose | {pose1} |
| Operating Mode | {opmode} |
| Battery Charge Level | 97 |
| Nearby User(s) | {detectedusers} |

...

TASK INSTANCE 160

| PARAMETER 424 | | VALUE 426 |
|---|---|---|
| Task Identifier | | {taskID} |
| Task Instance Identifier | | {instanceID} |
| Task Status | | {status} |
| Originator | | {sourceprocess} |
| Duration | | {duration} |
| Originator Priority | | {org_priority} |
| Condition Data | | {conditiondata} |
| | Start Time | {starttime} |
| | Expiration Time | {exptime} |
| Operation Data | | {operationdata} |

SYSTEM TO SCHEDULE AUTONOMOUS MOBILE DEVICE TASKS

BACKGROUND

An autonomous mobile device (AMD) performs tasks in a physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIGS. 4A and 4B illustrate various data used by the system, according to some implementations.

Figure 1:
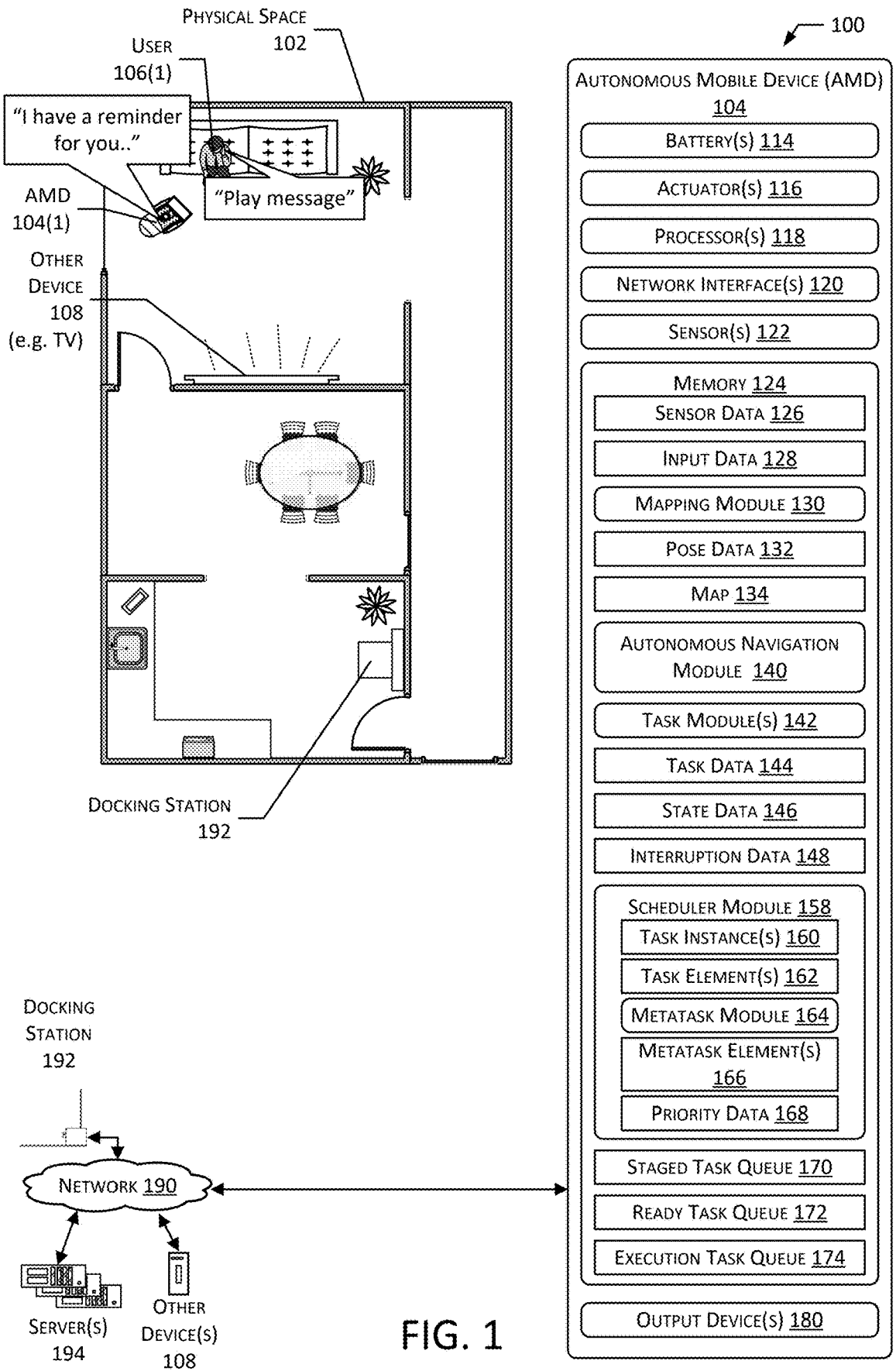
FIG. 1 illustrates a system to schedule tasks to operate an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) may interact with users and perform tasks that involve moving in the physical space, displaying information, accepting input, and so forth. Tasks may result from user commands, processes executing on the AMD, external or third-party systems, and so forth. For example, a user may use a voice user interface to specify a reminder at a particular date and time.

Traditional approaches to determine when tasks are to be performed lack the ability to scale to increased usage, or adequately adjust to changing situations. For example, task scheduling based on date and time leads to a poor user experience if there are competing tasks, a task is delayed, and so forth.

Described in this disclosure are systems and techniques for scheduling tasks associated with the AMD. A task may include one or more operations and associated conditions. A task may comprise a task element and one or more metatask elements. For example, a task to provide a particular reminder to a particular person may include a first metatask of finding that person in the physical space and a task element of presenting output. The task may be associated with one or more conditions. These conditions may be adaptive conditions or non-adaptive conditions. An adaptive condition is a condition that may be satisfied, or attempt to be satisfied, by the AMD performing an operation. For example, a task to provide a reminder to Anita specifies the condition that "Anita is detected by the AMD" and is an adaptive condition because the AMD can attempt to satisfy the condition by moving through the physical space to try and find and approach the user identified as "Anita". In comparison, a non-adaptive condition is satisfied without the AMD performing an operation. Continuing the earlier example, a non-adaptive condition associated with the task to provide a reminder to Anita may be a specified date and time at which to provide the reminder.

The AMD utilizes a scheduler module to determine task instances representative of particular tasks and the order in which those task instances are executed. If state data associated with the AMD satisfies the conditions associated with a task instance, that task instance may be enqueued in a "ready to execute" (RTE) queue. For example, a task instance for which the state data satisfies all conditions may be enqueued in the RTE queue.

A task instance, or the associated task elements, may be enqueued in the RTE queue if the non-adaptive conditions are satisfied but the adaptive conditions are not. One or more metatask elements that attempt to satisfy the adaptive conditions may then be included in the RTE queue.

Task elements and metatask elements may be prioritized for execution. In one implementation priorities may be determined before inclusion in the RTE queue. In another implementation priorities may be determined for the task instances or their associated task elements in the RTE queue. For example, each entry in the RTE queue may include a priority value. The entry having the greatest priority value may be executed next. The priority value for a particular task element or metatask element may be determined based on one or more of a specified priority value, a source of the task, user input, whether the task involves a user, duration of the operation of the task, and so forth. In some implementations a priority associated with a task may be propagated to associated task elements, metatask elements, or both.

Complementary metatask elements involve operations that may be performed simultaneously. For example, complementary metatask elements may have the same operation but different conditions. Metatask elements that are complementary may be joined, reducing duplicative operations by the AMD. For example, consider a first task instance that is associated with a first metatask element to "find Anita" and a second task instance associated with a second metatask element to "find Bob". The two metatasks may be combined to a single metatask element of "find Anita and Bob". For example, while searching for either Anita or Bob, if one of them is found, the metatask element and task elements associated with that found user may be performed. Once completed, the AMD may then proceed to find the remaining person and attempt to perform the metatask elements and task elements associated with that person.

Two or more metatask elements that involve the same operations and conditions may be consolidated to a single metatask that may then be associated with one or more task instances. For example, consider a first task instance that is associated with a first metatask element for the operation "go to kitchen" and a second task instance associated with a second metatask element for the operation "go to kitchen". The two metatask elements may be combined to a single metatask element of "go to kitchen". This reduces the time spent by the AMD and reduces power consumption associated with the AMD duplicating the same operation.

By using the techniques described herein, the AMD is able to determine which task instances to perform and when. Redundancy in performing operations is reduced, improving overall efficiency. Tasks are completed in a timely and efficient fashion, improving overall usability and effectiveness of the AMD.

Illustrative System

FIG. 1 illustrates a system 100 comprising a physical space 102 within which an autonomous mobile device (AMD) 104 is operating, according to some implementations. The physical space 102 may be one or more floors within a residence, office, vessel, and so forth. The physical space 102 may include one or more users 106.

The physical space 102 may include other devices 108. For example, the other devices 108 may include cellphones, tablets, televisions, network connected speakers, network connected security cameras, network connected appliances, and so forth. In some implementations, the other devices 108 may be in communication with the AMD 104, either directly or via intermediaries such as servers 194.

The AMD 104 may include battery(s) 114 to provide electrical power for operation of the AMD 104. The battery 114 may be rechargeable, allowing it to store electrical energy obtained from an external source, such as the docking station 192. In other implementations, a wireless power receiver may be used to provide power for operation of the AMD 104, recharge the battery 114, and so forth.

One or more actuators 116 such as rotary motors or linear motors enable the AMD 104 to move from one location in the physical space 102 to another. For example, an actuator may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interface(s) 120. The network interface(s) 120 provides communication to an external device, such as a server 194. The network interfaces 120 are discussed in more detail with regard to FIG. 3.

The AMD 104 includes one or more sensors 122 to acquire sensor data 126. For example, the sensors 122 may include microphones, time-of-flight (TOF) sensors, cameras, LIDAR, and so forth. The sensors 122 may generate sensor data 126. The sensors 122 have a sensor field of view (FOV), with the sensor data 126 being indicative of information about a portion of the physical space 102 within the sensor FOV. At any given time, the sensor FOV may encompass less than the totality of the physical space 102. For example, the sensor FOV may have a limited angular width and limited sensor effective distance, such as 2 meters. The sensors 122 are discussed in more detail with regard to FIG. 3.

The AMD 104 includes one or more memories 124. The memory 124 may comprise one or more non-transitory computer-readable storage media (CRSM). The memory 124 may store the sensor data 126 resulting from operation of the one or more sensors 122.

The AMD 104 may also receive or determine input data 128. For example, the input data 128 may be determined based on audio input such as speech by the user 106. In another example the input data 128 may comprise manual input provided by the user 106 via a keyboard or touchscreen. In yet another example, the input data 128 may be received from another device using the network interface 120.

The memory 124 may store one or more modules that may be executed at least in part by one or more of the processors 118.

The AMD 104 may include a mapping module 130. The mapping module 130 determines map data such as a map 134 based at least in part on sensor data 126. The map 134 is a representation of the physical space 102 that indicates objects and their locations in the physical space 102. The map 134 may include information such as location and type of other device 108 in the physical space 102. For example, the map 134 may indicate that a device classified as a "television" is present in the room labeled as the "living room". The map 134 may be representative of objects that have been determined to be persistent over time.

The maps 134 may comprise one or more layers representing different information. For example, a first layer may represent fixed objects such as walls and stairs, a second layer may represent dynamic obstacles such as users 106 and pets, a third layer may represent moveable obstacles such as doors and some furniture, a fourth layer may represent fixed furniture, a fifth layer may represent other devices 108, and so forth.

The mapping module 130 may include, or operate in conjunction with, a simultaneous localization and mapping (SLAM) module used to determine localization data, such as pose data 132. For example, the sensors 122 may include cameras that acquire images of the physical space 102. These images are processed to determine feature data representative of the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

The mapping module 130 may maintain the map data that associates the feature data with respect to the map 134. For example, a pose associated with particular coordinates and orientation with respect to the map 134 may be associated with feature data indicative of the features visible from that pose.

While the AMD 104 is moving, the mapping module 130 may provide as output a series of poses, each pose describing a location and rotations in the physical space 102. Each pose may be based, at least in part, on the apparent motion of observed features in the images. For example, from image to image at least some of the features that are described by descriptors will be in common. By determining the relative difference in apparent position in the image, of the same feature as observed by two different cameras at the same time, the location of the camera with respect to the feature in the physical space 102 may be determined. At successive times, and as the AMD 104 moves and additional images are determined from locations in the physical space 102, the apparent change in position of the same feature across the additional images may be used to determine subsequent poses. In some implementations, an orientation may comprise information about six dimensions (6D), that of three orthogonal axes and corresponding rotations about those axes.

The mapping module 130 may also use data from other sensors 122 such as motor encoders, inertial measurement units (IMU) with one or more accelerometers and gyroscopes, and so forth. For example, the IMU may generate inertial data indicative of rotations or accelerations along particular axes. This inertial data may be integrated to provide information about the movement of the AMD 104.

Localization is the process of determining pose data 132 indicative of a pose of the AMD 104 in the physical space 102 at a particular time. The pose data 132 may indicate localization based on some external reference, such as features visible in the physical space 102. A feature is detectable by a sensor 122. For example, a feature within an image may comprise a shadow, edge of a door frame depicted in the image, and so forth.

A pose is indicative of a location and orientation within the physical space 102. For example, pose data 132 may be specified as coordinates of (+39.2, −10.2, 0, 0°, 0°, 301°). The coordinates may be specified with respect to an origin, such as a docking station 192. The six coordinate values comprise a coordinate value of +39.2 meters (m) along an X-axis, a coordinate value of −10.2 m along a Y-axis, a coordinate value of 0 m along a Z-axis, and a coordinate value indicating rotation with respect to each of the axes, such as an orientation of 301 degrees relative to a specified direction with respect to rotation about a Z-axis. A Z-axis coordinate value may be indicative of a height value or elevation value for the AMD 104. A set of poses generated over time may describe a given AMD 104 trajectory. For example, trajectory data may comprise a time series of pose data 132.

During operation, the AMD 104 may determine the pose data 132 based on the sensor data 126. By knowing where the AMD 104 is, and which direction the sensors 122 of the AMD 104 are pointing, as provided by the pose data 132, the sensor data 126 may be used to determine information about where the objects are in the physical space 102. For example, the pose data 132 may be used to provide alignment and position information associated with a local map.

An autonomous navigation module 140 provides the AMD 104 with the ability to navigate within the physical space 102. The autonomous navigation module 140 may generate path plan data that is indicative of a path through the physical space 102 from the current location to a destination location. The AMD 104 may then begin moving along the path.

The AMD 104 may utilize one or more task modules 142. The task module 142 comprises instructions that, when executed, perform one or more tasks.

The task modules 142 may comprise instructions that when executed perform functions such as delivering a reminder, finding a user 106, following a user 106, presenting output on output devices 180 of the AMD 104, performing sentry tasks by moving the AMD 104 through the physical space 102 to determine the presence of unauthorized people, and so forth. In some implementations a task module 142 or portion thereof may be external to the AMD 104. For example, a third party task module 142 may send task data 144 to the AMD 104.

Tasks may be specified by task data 144 that may be stored within the memory 124. The task data 144 may specify one or more operations and conditions of the task. For example, operations specified by the task data 144 may comprise movements of the AMD 104, presenting output, and so forth. Operations may have associated conditions. For example, an operation of "move to" may have a condition in which the AMD is to attain a specified pose or a pose within a specified area, such as a specified room. The task data 144 is discussed in more detail with regard to FIG. 4A.

The AMD 104 also determines state data 146. The state data 146 may comprise information indicative of the physical space 102, the AMD 104, presence of users 106, and so forth. For example, the state data 146 may be indicative of current date and time, location and orientation of the AMD 104 in the physical space 102, location and identification data of the users 106 within range of the sensors 122 of the AMD 104, an operating mode of the AMD 104, and so forth. In some implementations, state data 146 may be based on data from an external source, or may be received by the AMD 104. For example, the other devices 108 in the physical space 102 may send information about their respective states to the AMD 104. The state data 146 is discussed in more detail with regard to FIG. 4A.

In some implementations, the memory 124 may store interruption data 148. The interruption data 148 provides information indicative of which task or associated task element or metatask element may interrupt another task, task element, or metatask element that is either in progress or is enqueued for execution. For example, the interruption data 148 may comprise data that indicates a task of "medication reminder" is permitted to interrupt a task of "play music". The interruption data 148 is discussed in more detail with regard to FIG. 4B.

A scheduler module 158 may accept as input the task data 144, the state data 146, and the interruption data 148. The scheduler module 158 may determine one or more task instances 160. A task instance 160 may comprise the details associated with performance of the task, such as the specified operations and conditions. For example, the task data 144 may specify a task to be performed daily, while the associated task instance 160 has conditions that specify today's date. The task instance 160 may comprise one or more task elements 162. For example, the task elements 162 may specify particular operations associated with that task. The task elements 162 may be associated with one or more conditions.

A metatask module 164 may determine if a task instance 160 or task element 162 has associated metatask elements 166. A task instance 160 or task element 162 may be associated with one or more metatask elements 166. For example, a task instance 160 to provide a reminder to user "Bob" may include a first metatask element 166(1) of finding "Bob" in the physical space 102 and a first task element 162(1) of presenting output. The task instance 160, task element 162, or associated metatask element 166, may be associated with one or more conditions. These conditions may be adaptive conditions or non-adaptive conditions.

An adaptive condition is a condition that may be satisfied, or attempt to be satisfied, by the AMD 104 performing an operation. For example, a task instance 160 to provide a reminder to "Anita" specifies the condition that "Anita is detected by the AMD 104". This is an adaptive condition because the AMD 104 can attempt to satisfy the condition. Continuing the example, based on the task instance 160, a metatask element 166 may be determined that specifies the "find" operation and has the condition of "Anita". When executed, this metatask element 166 operates the AMD 104 to move through the physical space 102 to attempt to find and approach the user identified as "Anita".

In comparison, a non-adaptive condition is satisfied without the AMD 104 performing an operation. Continuing the earlier example, suppose the task instance 160 has a condition that specifies the reminder is to be performed at a specific time, such as 7 pm. The AMD 104 must wait until the current clock time reaches the specific time or is within some threshold time window thereof before occurrence.

The scheduler module 158 may determine priority data 168. For example, the priority data 168 may comprise priority values that are associated with one or more of the task instances 160, task elements 162, or the metatask elements 166. In one implementation, execution may be prioritized based at least in part on the priority values. This is discussed in more detail with regard to FIG. 6.

During operation the scheduler module 158 may manage the contents of one or more queues, such as a staged task queue (STQ) 170, a ready task queue (RTQ) 172, and an execution task queue (ETQ) 174. In brief, the STQ 170 stores task instances 160 that are pending, but which are not yet ready for execution. For example, the STQ 170 may comprise the tasks associated with that date, but the time for their performance has not yet arrived. The RTQ 172 may store one or more of task instances 160, task elements 162, or metatask elements 166 that have had at least some conditions satisfied. For example, the RTQ 172 may comprise task 160elements 162 that have had all conditions satisfied and metatask elements 166 that have had the non-adaptive conditions satisfied. The scheduler module 158 may determine whether a current task in progress may be interrupted, priority of task instances 160, task elements 162, or metatask elements 166, and so forth. The resulting task 160elements 162 or metatask elements 166 may then be enqueued in the ETQ 174, such as in the order specified by the priority, for execution by the AMD 104. This is discussed in more detail with regard to FIG. 6.

Operation of the scheduler module 158 may be performed at specified time intervals, responsive to an event such as receipt of an interrupt, and so forth.

The AMD may comprise one or more output devices 180. These are discussed with regard to FIG. 3.

The AMD 104 may be configured to dock or connect to a docking station 192. The docking station 192 may provide external power which the AMD 104 may use to charge a battery 114 of the AMD 104. The docking station 192 may provide other functionality, such as restocking consumable supplies.

The AMD 104 may use a network 190 to access one or more servers 194. The servers 194 may process data from the AMD 104. The servers 194 may send data to the AMD 104 that may be subsequently used to operate the AMD 104. For example, a server 194 may send task data 144 or a task instance 160 to the AMD 104.

The AMD 104 may also communicate with the other devices 108. The other devices 108 may include one or more devices that are within the physical space 102 such as a home or associated with operation of one or more devices in the physical space 102. For example, the other devices 108 may include a doorbell camera, a garage door opener, a refrigerator, washing machine, and so forth. In some implementations the other devices 108 may include other AMDs 104, vehicles, and so forth.

Figure 2:
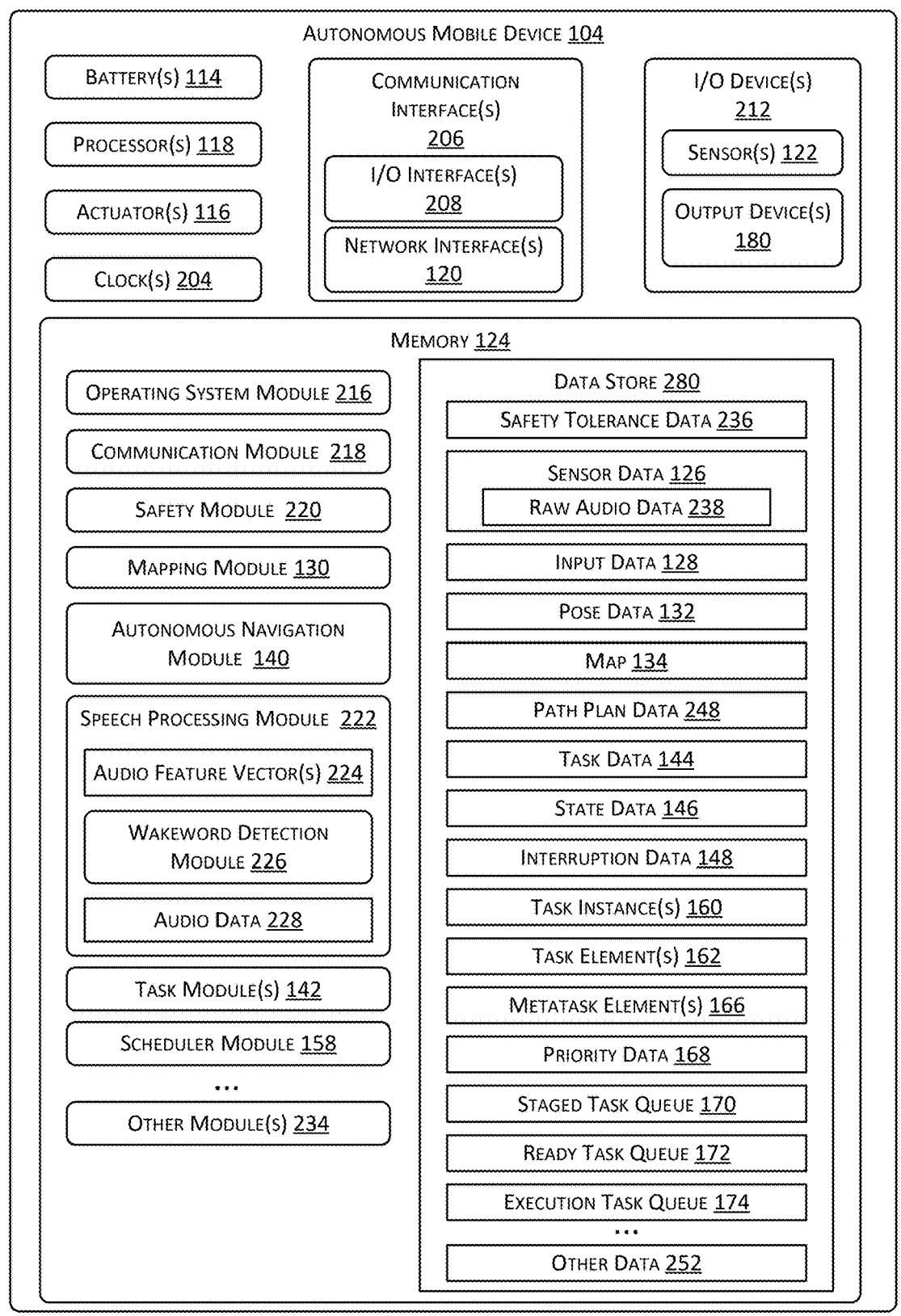
FIG. 2 is a block diagram of the components of the AMD, according to some implementations.

FIG. 2 is a block diagram 200 of the components of the AMD 104, according to some implementations.

As described, the AMD 104 may include one or more hardware processors 118 (processors) configured to execute one or more stored instructions. As described above, the AMD 104 may include one or more actuators 116 to enable the AMD 104 to move from one location in the physical space 102 to another.

The AMD 104 may include one or more batteries 114 or other power supply to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 204 may provide information indicative of date, time, ticks, and so forth. For example, the processor 118 may use data from the clock 204 to associate a particular time with an operation, sensor data 126, and so forth.

The AMD 104 may include one or more communication interfaces 206 such as input/output (I/O) interfaces 208, network interfaces 120, and so forth. The communication interfaces 206 enable the AMD 104, or components thereof, to communicate with other devices 108 or components. The communication interfaces 206 may include one or more I/O interfaces 208. The I/O interfaces 208 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 208 may couple to one or more I/O devices 212. The I/O devices 212 may include input devices such as one or more of a sensor 122, keyboard, mouse, scanner, and so forth. The I/O devices 212 may also include output devices 180 such as one or more of an actuator 116, light, speaker, display, projector, printer, and so forth. The output devices 180 are discussed in more detail with regard to FIG. 3. In some embodiments, the I/O devices 212 may be physically incorporated with the AMD 104 or may be externally placed.

The network interfaces 120 may be configured to provide communications between the AMD 104 and other devices 108 such as other AMDs 104, the docking station 192, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104. The network interfaces 120 are discussed in more detail with regards to FIG. 3.

As shown in FIG. 2, the AMD 104 includes one or more memories 124. The memory 124 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 124 provides storage of computer-readable instructions, data structures, program modules, and other data for the operation of the AMD 104. A few example functional modules are shown stored in the memory 124, although the same functionality may alternatively be implemented in hardware, firmware, or as a system on a chip (SoC).

The memory 124 may include at least one operating system (OS) module 216. The OS module 216 is configured to manage hardware resource devices such as the I/O interfaces 208, the I/O devices 212, the communication interfaces 206, and provide various services to applications or modules executing on the processors 118. The OS module 216 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 124 may be a data store 280 and one or more of the following modules. These modules may be executed as foreground applications, background tasks, daemons, and so forth. The data store 280 may use a flat file, database, linked list, tree, executable code, script, or other data structure to store information. In some implementations, the data store 280 or a portion of the memory 124 may be distributed across one or more other devices 108 including other AMDs 104, servers 194, network attached storage devices, and so forth.

A communication module 218 may be configured to establish communication with other devices 108, such as other AMDs 104, an external server 194, a docking station 192, and so forth. The communications may be authenticated, encrypted, and so forth.

Other modules within the memory 124 may include a safety module 220, the mapping module 130, the autonomous navigation module 140, a speech processing module 222, the one or more task modules 142, the scheduler module 158, or other modules 234. The modules may access memory within the data store 280, including safety tolerance data 236, sensor data 126, other data 252, and so forth.

During operation, the mapping module 130 may accept as input the sensor data 126 acquired by one or more sensors 122. The sensor data 126 may include one or more of image data, point cloud data, or other data. The image data may comprise images acquired by one or more cameras 344. The point cloud data may comprise one or more points with each point indicative of a presence of an object at a particular point in three-dimensional space. For example, the point cloud data may be determined based on output from a lidar 322, stereocamera, depth camera, and so forth.

The safety module 220 may access the safety tolerance data 236 to determine within what tolerances the AMD 104 may operate safely within the physical space 102. For example, the safety module 220 may be configured to stop the AMD 104 from moving when an extensible mast of the AMD 104 is extended. In another example, the safety tolerance data 236 may specify a minimum sound threshold which, when exceeded, stops all movement of the AMD 104. Continuing this example, detection of sound such as a yell would stop the AMD 104. In another example, the safety module 220 may access safety tolerance data 236 that specifies a minimum distance from an object that the AMD 104 is to maintain. Continuing this example, when a sensor 122 detects an object has approached to less than or equal to the minimum distance, all movement of the AMD 104 may be stopped. Movement of the AMD 104 may be stopped by one or more of inhibiting operations of one or more of the actuators 116, issuing a command to stop motor operation, disconnecting power from one or more the actuators 116, and so forth. The safety module 220 may be implemented as hardware, software, or a combination thereof.

The safety module 220 may control other factors, such as a maximum speed of the AMD 104 based on information obtained by the sensors 122, precision and accuracy of the sensor data 126, and so forth. For example, detection of an object by an optical sensor may include some error, such as when the distance to an object comprises a weighted average between the object and a background. As a result, the maximum speed permitted by the safety module 220 may be based on one or more factors such as the weight of the AMD 104, nature of the floor, distance to the object, and so forth. In the event that the maximum permissible speed differs from the maximum speed permitted by the safety module 220, the lesser speed may be utilized.

The autonomous navigation module 140 may use the map 134 to determine a set of possible paths along which the AMD 104 may move. One of these may be selected and used to determine path plan data 248 indicative of a path. For example, a possible path that is the shortest or has the fewest turns may be selected and used to determine the path. The path is then subsequently used to determine a set of commands that drive the actuators 116 connected to the wheels. For example, the autonomous navigation module 140 may determine the current location within the physical space 102 and determine path plan data 248 that describes the path to a destination location such as the docking station 192.

The speech processing module 222 may be used to process utterances of the user 106. Microphones may acquire audio in the presence of the AMD 104 and may send raw audio data 238 to an acoustic front end (AFE). The AFE may transform the raw audio data 238 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 238. The AFE may also perform acoustic echo cancellation (AEC) or other operations to account for output audio data that may be sent to a speaker of the AMD 104 for output. For example, the AMD 104 may be playing music or other audio that is being received from a network 190 in the form of output audio data. To avoid the output audio interfering with the device's ability to detect and process input audio, the AFE or other component may perform echo cancellation to remove the output audio data from the input raw audio data 238, or other operations.

The AFE may divide the raw audio data 238 into frames representing time intervals for which the AFE determines a number of values (i.e., features) representing qualities of the raw audio data 238, along with a set of those values (i.e., a feature vector or audio feature vector 224) representing features/qualities of the raw audio data 238 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 238, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 238) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as: the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user 106 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 238 or the audio feature vectors 224) to one or more server(s) 194 for speech processing. The audio data 228 corresponding to audio obtained by the microphone may be processed locally on one or more of the processors 118, sent to a server 194 for routing to a recipient device, or may be sent to the server 194 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the speech processing module 222, prior to sending to the server 194, and so forth.

The speech processing module 222 may include or access an automated speech recognition (ASR) module. The ASR module may accept as input raw audio data 238, audio feature vectors 224, or other sensor data 126, and so forth and may produce as output input data 128 comprising a text string or other data representation. The input data 128 comprising the text string or other data representation may be processed by the autonomous navigation module 140 to determine the command to be executed. For example, the utterance of the command "robot, come here" may result in input data 128 comprising the text string "come here". The wakeword "robot" may be omitted from the input data 128.

The AMD 104 may include one or more task modules 142 stored in the memory 124. The task modules 142 may provide various functionality, such as a sentry task module to determine if an unauthorized user is present, a videoconferencing task module to allow the user 106 to communicate with another party using the AMD 104, and so forth.

The AMD 104 may include the scheduler module 158 stored in the memory 124.

The AMD 104 may connect to the network 190 using one or more of the network interfaces 120. In some implementations, one or more of the modules or other functions described here may execute on the processors 118 of the AMD 104, on the server 194, or a combination thereof. For example, one or more servers 194 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to actual speech. For example, the speech synthesis module may be used by the AMD 104 to provide speech that a user 106 is able to understand.

The data store 280 may store the other data 252 as well. For example, localization settings may indicate local preferences such as language, user identifier data may be stored that allows for identification of a particular user 106, and so forth.

Figure 3:
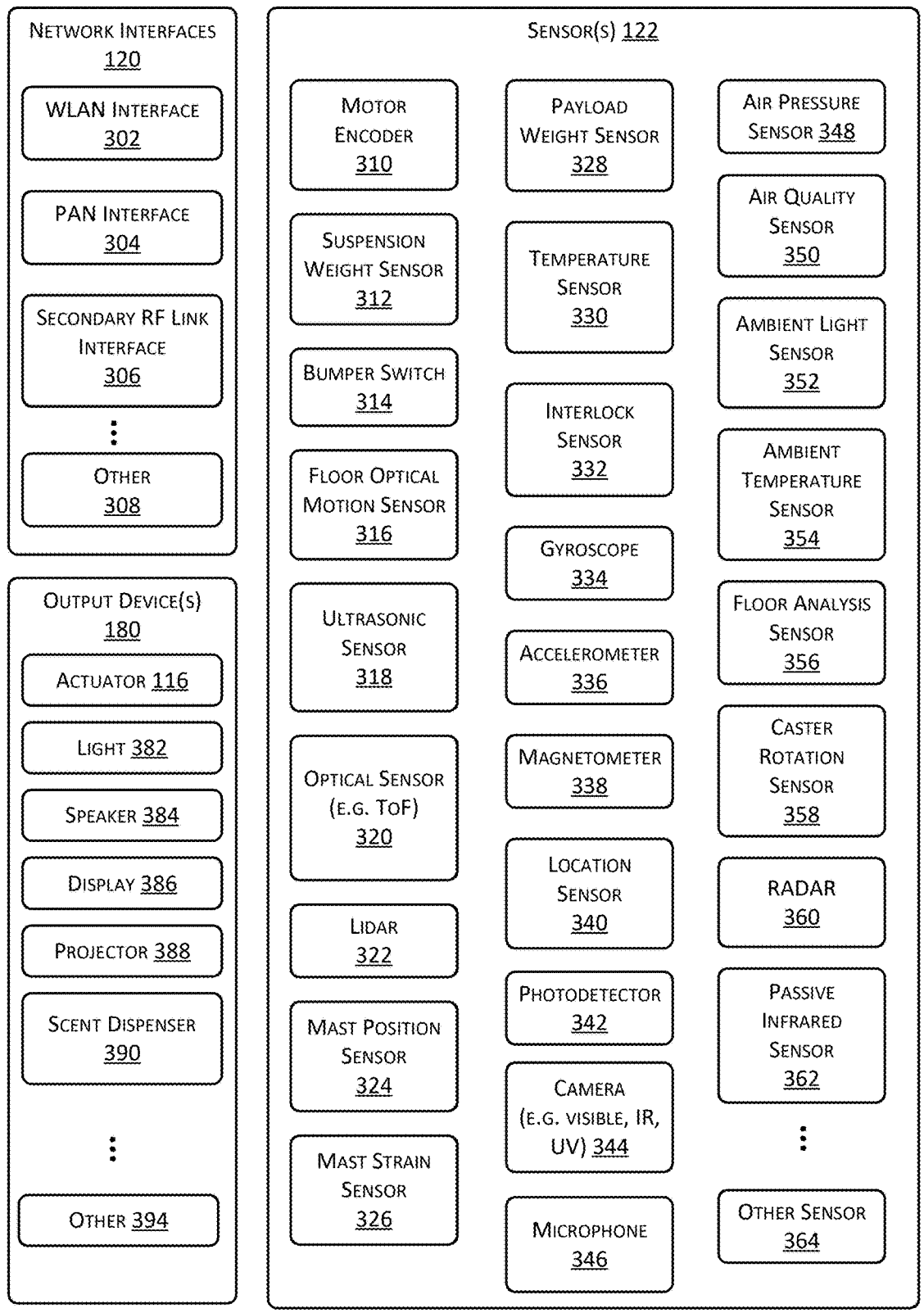
FIG. 3 is a block diagram of some components of the AMD, such as network interfaces, sensors, and output devices, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 120, output devices 180, or sensors 122 depicted here, or may utilize components not pictured. One or more of the sensors 122, output devices 180, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 108 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 192, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the LTE, 4G, 5G, or other standards.

The AMD 104 may include one or more of the following sensors 122. The sensors 122 depicted here are provided by way of illustration and not necessarily as a limitation. It is understood that other sensors 122 may be included or utilized by the AMD 104, while some sensors 122 may be omitted in some configurations.

A motor encoder 310 provides information indicative of the rotation or linear extension of an actuator 116. The actuator 116 may comprise a rotary motor, or a linear actuator. In some implementations, the motor encoder 310 may comprise a separate assembly such as a photodiode and encoder wheel that is affixed to the actuator 116. In other implementations, the motor encoder 310 may comprise circuitry configured to drive the actuator 116. For example, the autonomous navigation module 140 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 220 may use data from the suspension weight sensor 312 to determine whether or not to inhibit operation of one or more of the actuators 116. For example, if the suspension weight sensor 312 indicates no weight on the suspension, the implication is that the AMD 104 is no longer resting on its wheels, and thus operation of the actuators 116 may be inhibited. In another example, if the suspension weight sensor 312 indicates weight that exceeds a threshold value, the implication is that something heavy is resting on the AMD 104 and thus operation of the actuators 116 may be inhibited. For example, the threshold value may comprise a weight of a load that compresses a suspension system to a minimum height, or results in a mass that exceeds a torque output of the actuators 116 to maintain a minimum acceleration.

One or more bumper switches 314 provide an indication of physical contact between a bumper or other member that is in mechanical contact with the bumper switch 314. The safety module 220 utilizes sensor data 126 obtained by the bumper switches 314 to modify the operation of the AMD 104. For example, if the bumper switch 314 associated with a front of the AMD 104 is triggered, the safety module 220 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 122 to an object.

The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 122 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 220 and the autonomous navigation module 140 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

One or more optical sensors 320 may be used as a cliff sensor. The AMD 104 may have one or more cliff sensors located on a front portion of the AMD 104. For example, the cliff sensors may be time-of-flight sensors that have a field of view directed downward toward a floor over which the AMD 104 is moving.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 140 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 220. For example, if the AMD 104 is preparing to move, data from the mast position sensor 324 may be checked to determine if the mast is retracted, and if not, the mast may be retracted before beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 220 may utilize sensor data 126 obtained by the mast strain sensor 326. For example, if the strain applied to the mast exceeds a threshold amount, the safety module 220 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 220 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more of the batteries 114, one or more actuators 116, and so forth. In the event the temperature exceeds a threshold value, the component associated with that device temperature sensor 330 may be shut down. For example, the threshold value may be determined based on component specifications, such as a maximum permissible temperature of the batteries 114.

One or more interlock sensors 332 may provide data to the safety module 220 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, a gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 126 comprising images being sent to the autonomous navigation module 140. In another example, the camera 344 may comprise a 10 megapixel or greater camera that is used for videoconferencing or for acquiring pictures for the user 106.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 140 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users 106, determine a direction of an utterance, determine ambient noise levels, for voice communication with another user 106 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as a photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 220, the autonomous navigation module 140, the task module 142, and so forth. For example, if the floor analysis sensor 356 determines that the floor is wet, the safety module 220 may decrease the speed of the AMD 104 and generate a notification alerting the user 106.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 122 may include a radar 360. The radar 360 may be used to provide information as to a distance, lateral position, and so forth, to an object.

The sensors 122 may include a passive infrared (PIR) sensor 362. The PIR sensor 362 may be used to detect the presence of users 106, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 140. One or more touch sensors may be utilized to determine contact with a user 106 or other objects.

The AMD 104 may include one or more output devices 180. An actuator 116 may be used to provide linear or rotary motion to move the AMD 104 or portion thereof. actuators 116 may comprise an electrically operated mechanism such as one or more of a motor, solenoid, piezoelectric material, electroactive polymer, shape-memory alloy, and so forth. An actuator controller may be used to provide a signal or other input that operates one or more of the actuators 116.

A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor to accept user input and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

In other implementations, other 394 output devices 180 may be utilized. For example, the AMD 104 may include a haptic output device that provides output that produces particular touch sensations to the user 106. Continuing the example, an actuator 116 with an eccentric weight may be used to create a buzz or vibration to allow the AMD 104 to simulate the purr of a cat.

Figure 4B:
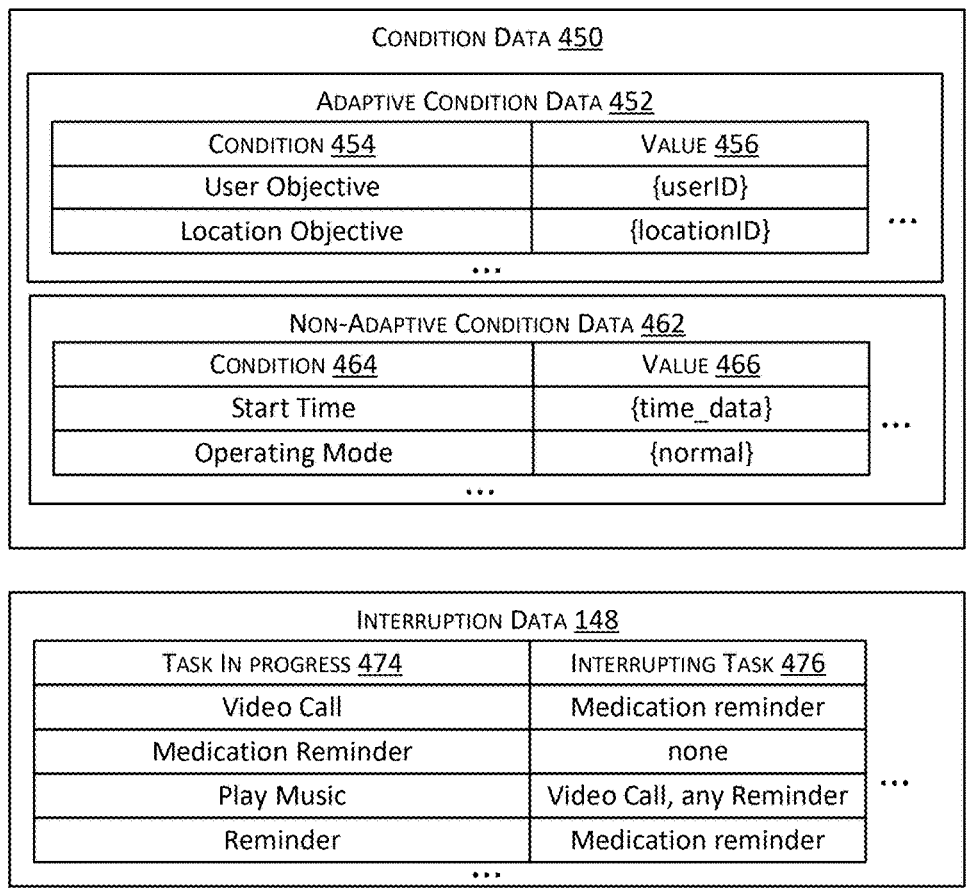

FIGS. 4A and 4B illustrate various data used by the system 100, according to some implementations. The data are depicted as tables by way of illustration and not as a limitation. In other implementations other data structures may be used.

The task data 144 may comprise one or more parameters 404 and their associated values 406. A task identifier is indicative of a particular task. An originator is indicative of a source of that task data. For example, the originator may be indicative of a particular process, application, external service, user identifier, and so forth. A duration is indicative of an expected length of time the task is expected to take. The duration may be specified as a category such as "long" or "short", as a length of time such as in seconds, and so forth. An originator priority is indicative of a priority for the task that is asserted by the originator. Condition data is indicative of one or more conditions that are associated with the task. These may include non-adaptive conditions and adaptive conditions. The condition data is discussed in more detail with regard to FIG. 4B. The operation data is indicative of one or more operations that are associated with the task. For example, the operation data may indicate a set of operations such as moving the AMD 104, finding a particular user 106, and so forth.

The state data 146 is indicative of a state associated with the AMD 104 and may comprise one or more states 414 and their associated values 416. The state data 146 may be based on sensor data 126, input data 128, pose data 132, and so forth. In some implementations the state data 146 may be based on or indicative of external input data. For example, the external input data may be provided from the other devices 108 in the physical space 102, the servers 194, and so forth.

The state data 146 may comprise a current date/time state indicative of a current date or time, such as provided by a realtime clock 204. A current pose may be based on the pose data 132 and indicate one or more of a current location or orientation of the AMD 104 with regard to the physical space 102 or the map 134 of the physical space 102. An operating mode indicates a current operating mode of the AMD 104. The AMD 104 may have various operating modes, such as a "do not disturb" mode in which interruptions are minimized, privacy mode in which one or more sensors 122 are disabled, normal mode in which the AMD 104 may operate without restriction, and so forth. A battery charge level is indicative of the power remaining within the one or more batteries 114. Nearby user(s) provides information about any users 106 who have been detected and their identification. A user 106 may be deemed to be nearby if within range of a sensor 122, if within the same room or other designated area, if less than a threshold distance from the AMD 104, and so forth. In some implementations the AMD 104 may assert an identification of the user 106. For example, a facial recognition module may assert an identity based on processing an image of at least a portion of the user 106, such as their face.

Other state data 146 may include an inventory of objects currently held by the AMD 104, a position of one or more of the actuators 116, and so forth.

The task instance 160 may comprise one or more parameters 424 and their associated values 426. A task instance 160 may include one or more of the parameters 404 and values 406 based on the task data 144. For example, the task instance 160 may include the task identifier, the condition data, the operation data, and so forth.

The one or more parameters 424 may include one or more of the following. The task identifier indicates the associated task data 144. A task instance identifier is indicative of the particular instance. A task status is indicative of whether the instance is pending, in progress, awaiting retry, failed, and so forth. For example, a task instance 160 that has been attempted greater than a threshold number of times or which has expired may be deemed to have a status of failed. An originator of the task may be notified of the failure.

One or more of the condition data or the operation data for a task instance 160 may contain additional information with respect to the task data 144. In this illustration, the condition data may include additional parameters such as a start time and an expiration time. The start time indicates a time that the task instance 160 is to commence or is eligible to commence. For example, the start time may specify that the task instance 160 is to begin on or after 6 pm. The expiration time may indicate a time that the task instance 160 is to expire. For example, the expiration time may specify that the task instance 160 is to be begin or is to be complete by a specified time.

As shown in FIG. 4B, the condition data 450 may comprise adaptive condition data 452 and non-adaptive condition data 462. The adaptive condition data 452 may comprise one or more conditions 454 and associated values 456 indicative of adaptive conditions. An adaptive condition is a condition 450 that may be satisfied, or attempt to be satisfied, by the AMD 104 performing an operation. An adaptive condition 454 may specify a user objective that is indicative of a particular user identifier representing a particular user 106. An adaptive condition 454 may specify a location objective that is indicative of a particular location or pose in the physical space 102.

The non-adaptive condition data 462 may comprise one or more conditions 464 and associated values 466 indicative of non-adaptive conditions 464. A non-adaptive condition 464 is satisfied without the AMD 104 performing an operation. For example, non-adaptive conditions 464 may comprise the start time, expiration time, and so forth. In some implementations a non-adaptive condition 464 may comprise a condition that is unable to be satisfied by an operation performed by the AMD 104. For example, if the AMD 104 has no manipulators, a condition specifying that the AMD 104 is to have possession of a physical object such as a hairbrush is a non-adaptive condition 464, as an external agent such as the user 106 is needed to satisfy the condition by placing the object in the payload bay of the AMD 104.

A non-adaptive condition 464 may specify that the AMD 104 is or is not operating in a specified operating mode. For example, responsive to user input data 128 the AMD 104 may transition from a normal mode to a privacy mode. While in the normal mode the AMD 104 may be permitted to perform operations associated with tasks. In contrast, while in the privacy mode at least some of the sensors 122 may be disabled and the AMD 104 may be prevented from performing operations associated with tasks. If the AMD 104 is unable to transition from the privacy mode to the normal mode, a non-adaptive condition 464 may specify the operating mode as "normal".

The task element 162 (not shown in FIG. 4A) may be the same or similar to the task instance 160. The metatask element 166 (not shown in FIG. 4A) may be the same or similar to the task instance 160.

The interruption data 148 provides information indicative of which task, task element 162, or associated metatask element 166 may interrupt another task, task element 162, or metatask element 166 that is either in progress or is enqueued for execution. The interruption data 148 may comprise a matrix relating a task in progress 474 to an interrupting task 476 that is permitted to interrupt the task in progress 474. For example, if the task in progress 474 is "video call", it may be interrupted by a "medication reminder" task. In another example, a "reminder" task may only be interrupted by a "medication reminder" task.

Individual tasks are depicted for ease of illustration and not as a limitation. In other implementations other groupings may be specified. For example, task types or task categories may be used instead of or in addition to individual tasks.

In one implementation the task data 144 may be used in place of the task instance 160 and the task instance 160 may be omitted. In another implementation the task instance 160 may be used in place of the task data 144 and the task data 144 may be omitted.

Figure 5:
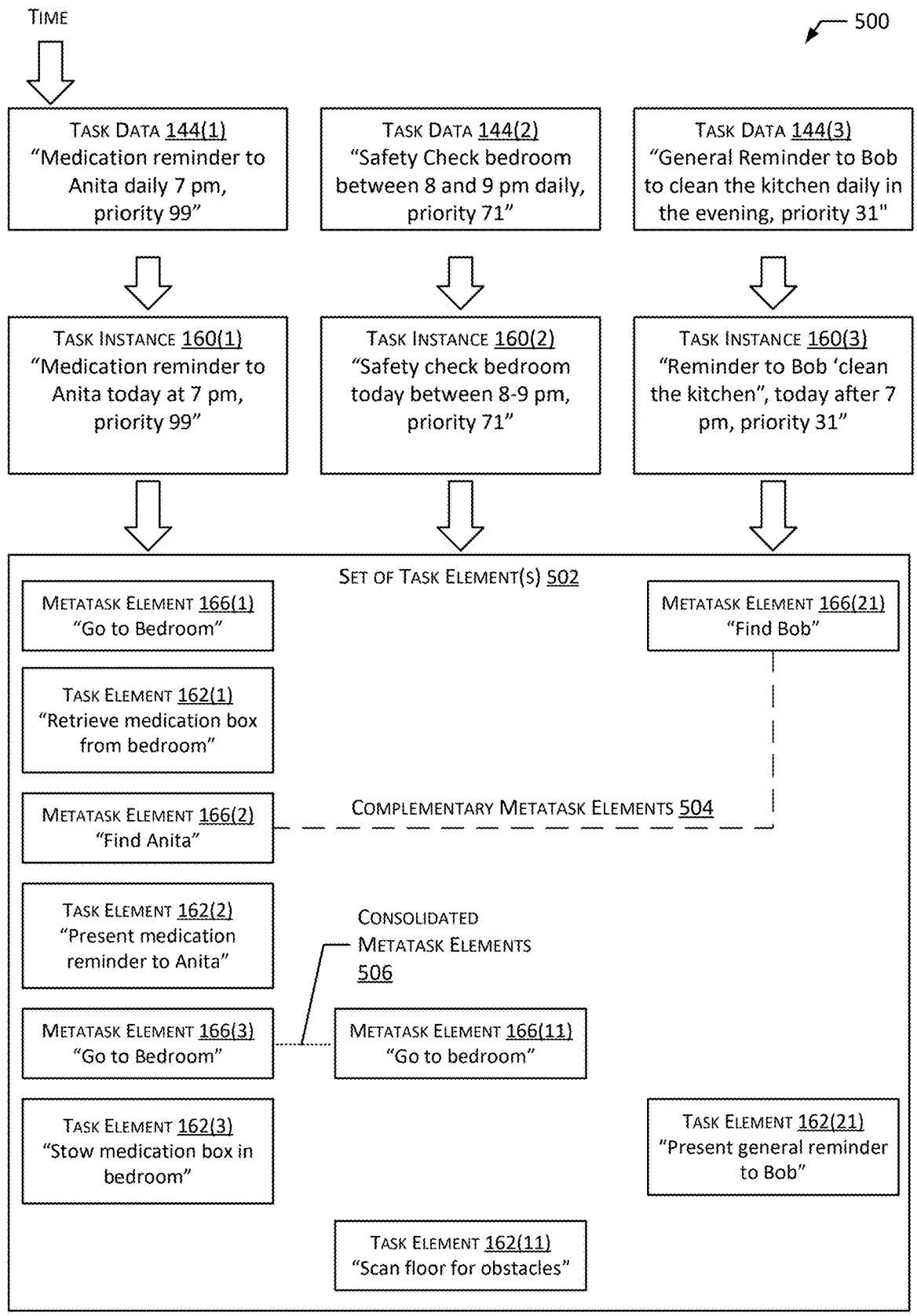
FIG. 5 illustrates task data, associated task instances, and associated elements, according to some implementations.

FIG. 5 illustrates at 500 task data 144, associated task instances 160, and corresponding sets of elements 502, according to some implementations. In this figure, time may be considered to increase down the page. For example, task data 144 is determined, a task instance 160 is determined later, and a take element 162 or metatask element 166 is determined after that.

As described above, task data 144 specifies a task. The task data 144 may be processed to determine a task instance 160. For example, the task data 144(1) specifies a "medication reminder to Anita daily 7 pm, priority 99". The scheduler module 158 may process the task data 144 to determine those processes that have upcoming performance times. For example, the scheduler module 158 may process the task data 144 to determine the tasks that are to be performed in the next 24 hours. Task instances 160 are then determined that represent those tasks to be performed. Continuing the earlier example, the task data 144(1) specifies a daily recurrence, while the associated task instance 160(1) may specify today's date as the date the task is to be performed. A task instance 160 may specify one or more task elements 162 indicative of operations to be performed. In some implementations, the task elements 162 are specific to a particular task type. For example, a "medication reminder" task element 162(2) may differ from a "general reminder" task element 162(21) in terms of output presented such as having different audio prompts, different presented graphics, different motions of the AMD 104's actuators, and so forth.

The metatask module 164 may determine, based at least in part on the task instance 160 one or more associated metatask elements 166. In one implementation, the metatask module 164 may assess the operation data included in the task instance 160 to determine one or more operations and associated conditions. A metatask element 166 may be determined for operations that are associated with adaptive conditions.

In this illustration, the task instance 160(1) specifies several task elements, such as a task element 162(1) to retrieve a medication box from a bedroom, a task element 162(2) to present a medication reminder to Anita, and a task element 162(3) to return and stow the medication box in the bedroom.

Based on these task elements 162(1)-(3), the metatask module 164 may determine metatask elements 166 to satisfy the adaptive conditions associated with these task elements 162(1)-(3).

The task element 162(1) specifies retrieval of a medication box from the bedroom. Based on this information, a metatask element 166(1) to go to the bedroom is determined.

The task instance 160(1) specifies a particular user 106 of "Anita". For example, the task element 162(2) specifies presenting a medication reminder to Anita. Based on this, a metatask element 166(2) is determined that involves finding the user 106 identified as "Anita" in an attempt to satisfy this adaptive condition associated with the task element 162(2).

Similarly, based on the task element 162(3), a metatask element 166(3) specifies that the AMD 104 is to go to the bedroom. The task element 162(3) specifies stowing the medication box in its appointed location.

Such as shown here, in some implementations a metatask element 166 may be determined for each of the operations specified by the task instance 160. In other implementations, metatask elements 166 may be determined based on the adaptive conditions associated with the task instance 160. For example, metatask elements 166 may be determined in an attempt by the AMD 104 to satisfy the adaptive conditions associated with the task instance 160.

During operation of the scheduler module 158, complementary metatask elements 504 may be determined. Complementary metatask elements 504 may involve operations that may be performed simultaneously. Complementary metatask elements 504 may specify the same operation or type of operation, but different conditions. Metatask elements that are complementary may be joined, reducing duplicative operations by the AMD 104. For example, the metatask element 166(2) involves the operation of finding the user "Anita". Metatask element 166(21) involves the operation of finding the user "Bob". In some implementations, instead of individual metatask elements 166(2) and 166(21), the AMD 104 may attempt to satisfy both conditions by creating a single metatask element 166(71) that involves a combined operation such as "find Anita OR Bob" or "find Anita AND if Bob detected store Bob's location".

In one implementation the task instance 160 and associated task elements 162 and metatask elements 160 of the first user found may be performed. For example, if Bob is found first, the general reminder associated with him may be presented, before the AMD 104 continues to try and find Anita to complete the medication reminder. In other implementations, the AMD 104 may note the location of a detected user associated with a task, and may continue searching to complete a higher priority task. For example, the AMD 104 may determine the location of Bob, continue to find Anita and provide the medication reminder, and then return to the location where Bob was observed to attempt to deliver Bob's reminder.

The determination and subsequent execution of complementary metatask elements 504 results in a substantial improvement in user experience as well as overall efficiency of the AMD 104 during operation. For example, as shown in this illustration if Bob is detected while searching for Anita, either the reminder to Bob may be presented, or his location may be stored for later use, such that the AMD 104 may be able to more quickly locate Bob later.

The metatask module 164 may determine consolidated metatask elements 506. Two or more metatask elements 166 that involve the same operations and conditions may be deemed to be consolidated metatask elements 506. These two or more metatask elements 166 may then be consolidated to a single metatask element 166. For example, metatask element 166(3) to "go to bedroom" has the same operation (go to) and the same condition (bedroom) as metatask element 166(11). The two metatask elements may be combined to a single metatask element 166 of "go to bedroom". The determination and subsequent execution of consolidated metatask elements 506 results in a substantial improvement in user experience as well as overall efficiency of the AMD 104 during operation. For example, repetition of redundant metatask elements 166 is reduced or eliminated, reducing power consumption, time spent performing a task, noise associated with movement in the physical space 102, and so forth.

The scheduler module 158 may arrange one or more of the task instances 160 or assocaited task elements 162 or metatask elements 166 for execution based on one or more of the priority, determined complementary metatask elements 504, determined consolidated metatask elements 506, duration, and so forth. In this illustration, the metatask element 166(1) has a greater priority value and so is scheduled for execution before metatask element 166(21) or 166(11). Because task instance 160(3) is associated with an earlier start time than task instance 160(2), the associated metatask element 166(21) is scheduled for execution before metatask element 166(11).

In one implementation, failure of a task instance 160 or associated task elements 162 or metatask element 166 may result in a re-try attempt. If a maximum number of retries is exceeded, the status of the instance may be designated as "failed". A failure of a task element 162 or metatask element 166 may result in an overall failure of the associated task instance 160. A notification may be sent to a originator of the task instance 160.

A failed task instance 160 may be removed from further consideration by the scheduler module 158. For example, failure of a task instance 160 may be reported to the originator, and the task instance 160 may be removed from one or more of the STQ 170, RTQ 172, or ETQ 174.

During operation, the scheduler module 158 or other modules may maintain information indicative of the association between task instances 160 and respective associated task elements 162 and metatask elements 166. For example, each metatask element 166 may be associated with information indicative of one or more task instance identifiers representative of particular task instances 160.

Figure 6:
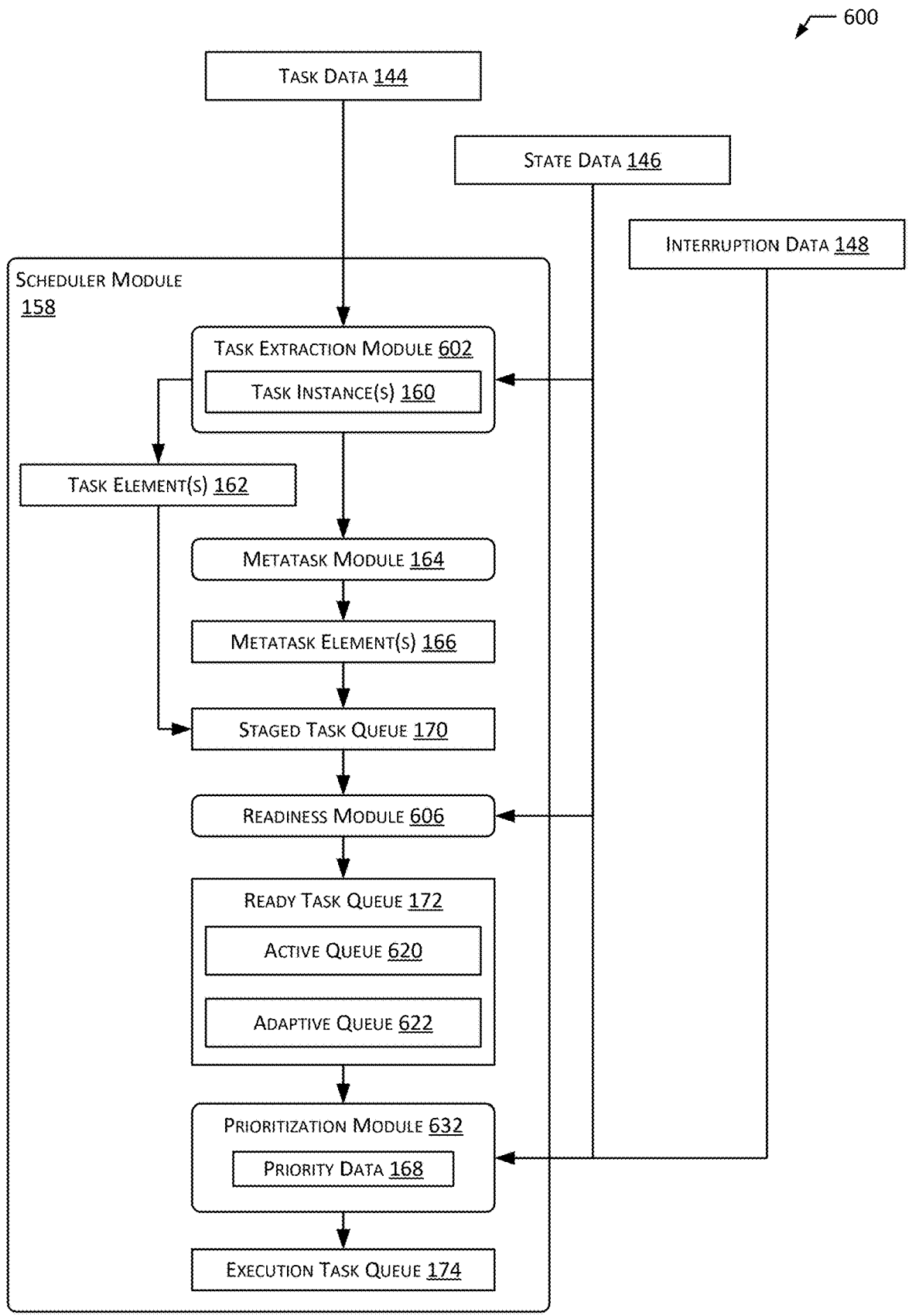
FIG. 6 is a block diagram of a scheduler module to schedule tasks for execution on an AMD, according to some implementations.

FIG. 6 is a block diagram 600 of a scheduler module 158 to schedule tasks for execution on the AMD 104, according to some implementations. The order in which these modules operate is not necessarily limited to the order in which they are described herein.

The scheduler module 158 may comprise a task extraction module 602. The task extraction module 602 may determine, based on the task data 144 and the state data 146, one or more task instances 160. The task instances 160 may comprise one or more task elements 162. In one implementation, the task extraction module 602 may determine instances of the task data 144 that are associated with specific condition data that are satisfied by the state data 146. For example, the task extraction module 602 may determine task data 144 that represent tasks that are to be scheduled within the next 24 hours. Continuing the example, if the state data 146 indicates today is a Thursday and the task data 144 specifies a recurrence on "Every Thursday", a task instance 160 is determined that specifies a start time of today.

As described above with regard to FIG. 5, the metatask module 164 determines one or more metatask elements 166. For example, a metatask element 166 may be determined that specifies an operation that attempts to satisfy an adaptive condition of the associated task element 162 of a task instance 160. In some implementations a metatask element 166 may comprise a prerequisite or antecedent task with respect to an associated task element 166.

One or more of the task instances 160, task elements 162, or metatask elements 166 may be enqueued within the STQ 170. Continuing the earlier example, the STQ 170 may comprise task instances 160 and one or more of task elements 162 or associated metatask elements 166 that are to be performed during a specified 24 hour period.

A readiness module 606 may determine whether to transfer an element from the STQ 170 to the RTQ 172 based at least in part on the state data 146. In some implementations, the RTQ 172 may include an active queue 620 and an adaptive queue 622. The active queue 620 may comprise those task 160elements 162 for which all conditions are satisfied. In comparison, the adaptive queue 622 may comprise those metatask elements 166 that have satisfied the non-adaptive conditions but have not yet satisfied the adaptive conditions. The process associated with the readiness module 606 is described in more detail with regard to FIG. 7.

A prioritization module 632 may be used to determine the priority of execution of the elements in the RTQ 172. The execution priority may be determined based on one or more techniques. A first technique establishes priority based on the originating queue. For example, execution of entries in the active queue 620 may be performed before the entries in the adaptive queue 622, or vice versa.

A second technique determines priority based on the priority data 168. For example, the instance associated with the greatest priority value may be executed next.

A third technique determines priority based on the dependent metatask elements 166, if any. For example, a task instance 160(71) with no associated metatask elements 166 may be prioritized for execution before a task instance 160(72) that has five metatask elements 166(81-85). In another example, a metatask element 166(81) may be prioritized for execution over the task instance 160(71) that has no associated metatask elements 166.

In some implementations one or more of the techniques may be combined to determine the priority. In some implementations the techniques may be used to determine a priority value that is then used to determine the execution priority. The priority values may be determined based on one or more of the originator of the task data 144, user input, the task data 144 indicating an interaction with a user 106, duration of operation, and so forth. For example, a task instance 160 or metatask element 166 that includes an operation that involves a user 106 may be prioritized over another instance that does not.

The prioritization module 632 may enqueue elements in the ETQ 174 for execution by the AMD 104 or other devices 108 based on the determined priority. For example, the prioritization module 632 may enqueue elements in the ETQ 174 obtained from the RTQ 172 based on descending priority value.

In some implementations the prioritization module 632 may utilize the interruption data 148. For example, the state data 146 may indicate to the prioritization module 632 a currently executing task instance 160, task elements 162, or metatask element 166. The interruption data 148 may be used to assess the currently executing task with respect to the next instance to be executed. If the next instance to be executed as specified by the interruption data 148 permits an interruption, the prioritization module 632 may terminate the currently executing task and enqueue the next element in the ETQ 174 for execution.

The AMD 104 is then operated based on the elements enqueued in the ETQ 174. For example, the AMD 104 may perform the operations specified by the task instances 160, task elements 162, or metatask elements 166 in the ETQ 174.

Figure 7:
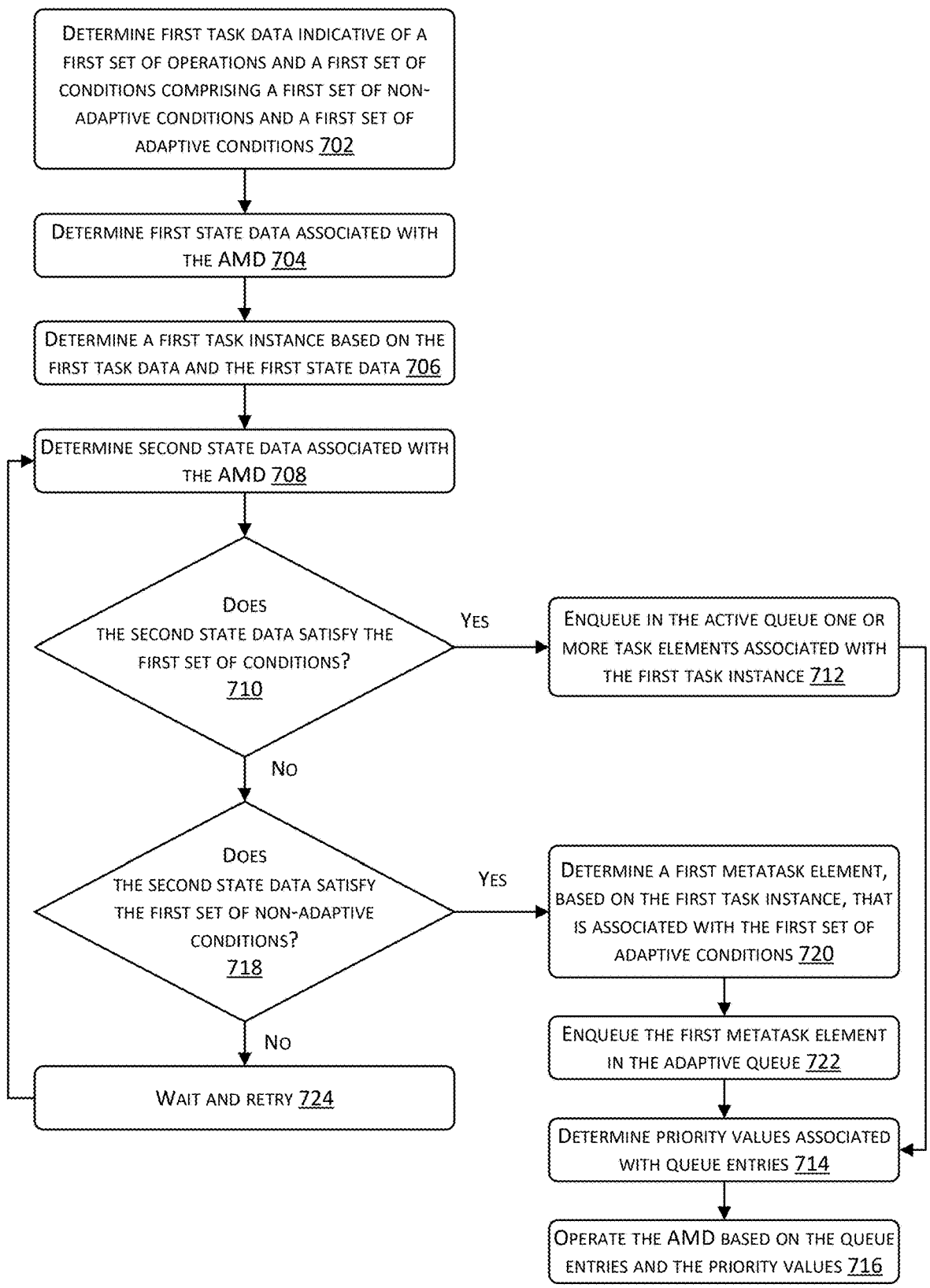
FIG. 7 is a flow diagram of a process to determine tasks to operate an AMD, according to some implementations.

FIG. 7 is a flow diagram 700 of a process to determine tasks to operate an AMD 104, according to some implementations. The process may be performed by one or more of the AMD 104, the other devices 108, or the servers 194.

At 702 first task data 144(1) is determined. For example, the first task data 144 may be retrieved from the memory 124, received via the network interface 120, and so forth. The first task data 144 is indicative of a first task that is associated with a first set of operations. The first set of operations may comprise a first set of non-adaptive conditions 454 and a first set of adaptive conditions 464.

At 704 first state data 146(1) associated with the AMD 104 is determined. For example, the first state data 146(1) may comprise data indicative of the current time as determined by the realtime clock 204.

At 706 a first task instance 160(1) is determined based on the first task data 144(1) and the first state data 146(1). For example, the task extraction module 602 may determine the first task instance 160(1) based on the current time of the first state data 146(1) corresponding to a condition for execution of the first task data 144(1).

At 708 second state data 146(2) indicative of the AMD 104 is determined. For example, the second state data 146(2) may be indicative of a particular user 106 being nearby the AMD 104, a room that the AMD 104 is currently located in, and so forth.

At 710 a determination is made as to whether the second state data 146(2) satisfies the first set of conditions. If the determination at 710 is yes, the process may proceed to 712. At 712 one or more task elements 162 associated with the first task instance 160(1) are enqueued in the RTQ 172. In some implementations, the first task instance 160(1) or the task elements 162 associated therewith may be enqueued in the active queue 620. The process may then proceed to 714.

At 714 one or more priority values are determined that are associated with the queue entries. For example, the prioritization module 632 may determine a first priority value associated with the first task instance 160(1), and other priority values associated with other instances such as other task instances 160, task elements 162, or metatask elements 166 that are enqueued.

At 716 the AMD 104 is operated based on the queue entries. For example, the AMD 104 may operate based on the operations associated with the instances in the ETQ 174. Continuing the example in which the first metatask element 166(1) has been enqueued within the EQT 174, at least a portion of the first set of operations that are associated with the first metatask element 166(1) may be used to operate the AMD 104.

Completion of a metatask element 166 may result in execution of associated queue entries. For example, completion of the first metatask element 166(1) may result in the first task instance 160(1), a task element 162, or other associated metatask elements 166 being executed.

As operations are performed, additional state data 146 may be determined. This additional state data 146 may result in a determination that one or more conditions of a task instance 160 or task element 162 in the active queue 620 have been satisfied, or that one or more conditions of a metatask element 166 in the adaptive queue 622 have been satisfied.

In some implementations the order of execution may be based on the priority values. For example, the elements enqueued in the RTQ 172 may be executed in a priority specified by their respective priority values, such that highest priority value instances are executed before lower priority value elements.

In some implementations, the conditions of the enqueued elements may be re-assessed based on state data 146. For example, after 722 third state data 146(3) may be determined. The conditions associated with the next entry in the RTQ 172 for execution may be compared to the third state data 146(3) to confirm those conditions remain satisfied.

Returning to 710, if the determination is no, the process proceeds to 718.

At 718 a determination is made as to whether the second state data 146(2) satisfies the first set of non-adaptive conditions 464. If yes, the process may proceed to 720. Given a determination of yes with regard to 710, the first task instance 160(1) will have satisfied the first set of non-adaptive conditions 464 but has not satisfied the adaptive conditions 454. It is understood that in other implementations other determinations may be utilized that are logically equivalent.

At 720 a first metatask element 166(1) is determined based on the first task instance 160(1) or a task element 162 thereof. For example, the metatask module 164 may accept as input the first task instance 160(1) and provide as output the first metatask element 166(1). Based on the association between the first metatask element 166(1) and the first task instance 160(1), the first metatask element 166(1) is associated with the first set of adaptive conditions 454 of the first task instance 160(1).

At 722 the first metatask element 166(1) is enqueued in the RTQ 172. In some implementations, the first metatask element 166(1) may be enqueued in the adaptive queue 622. The process may then proceed to 714.

Returning to 718, if the determination is no, the process proceeds to 724. At 724 if the first the process may wait and retry by returning to 708. If the number of retries exceeds a threshold value, the instance may be deemed to have failed and may be canceled. A failed instance and associated instances may be removed from the queues. For example, if the first metatask element 166(1) fails the first metatask element 166(1) and the first task instance 160(1) and associated task elements 162 may be removed from the ETQ 174.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

What is claimed is:

1. An autonomous mobile device (AMD) located in a first physical space, the AMD comprising:
   one or more sensors;
   one or more processors; and
   one or more memories storing computer-executable instructions, which when executed using the one or more processors, cause the AMD to:
      determine first task data indicative of a first set of operations, a first set of non-adaptive conditions, and a first set of adaptive conditions;
      determine first state data associated with the AMD;

determine a first task instance based on the first task data and the first state data;
determine second state data associated with the AMD;
determine that the second state data satisfies the first set of non-adaptive conditions but does not satisfy the first set of adaptive conditions;
determine a first task element based on the first task instance, wherein the first task element comprises at least a portion of the first set of operations;
determine a first metatask element based on the first task instance, wherein the first metatask element comprises one or more operations that are associated with the first set of adaptive conditions;
responsive to the determination that the second state data satisfies the first set of non-adaptive conditions but does not satisfy the first set of adaptive conditions, enqueue the first metatask element in an adaptive queue;
operate, at a first time, the AMD based on the first metatask element and entries in the adaptive queue;
determine third state data associated with the AMD;
determine that the third state data satisfies the first set of adaptive conditions;
responsive to the determination that the third state data satisfies the first set of adaptive conditions, enqueue the first task element in an active queue; and
operate, at a second time, the AMD based on the first task element and entries in the active queue.

2. The AMD of claim 1, wherein the one or more memories store computer-executable instructions, which when executed using the one or more processors, cause the AMD to:
determine, after the first time and before the second time, that the third state data also satisfies the first set of non-adaptive conditions.

3. The AMD of claim 1, wherein the one or more memories store computer-executable instructions, which when executed using the one or more processors, cause the AMD to:
determine second task data indicative of:
a second set of operations, and
one or more conditions;
determine fourth state data associated with the AMD;
determine a second task instance based on the second task data and the fourth state data;
determine a second task element based on the second task instance, wherein the second task element comprises at least a portion of the second set of operations;
determine a first priority value associated with the first metatask element;
determine a second priority value associated with the second task element;
determine fifth state data associated with the AMD;
determine that the fifth state data satisfies the one or more conditions of the second task instance; and
responsive to a determination that the first priority value is less than the second priority value, operate the AMD at a third time that is before the first time, based on the second task element.

4. The AMD of claim 1, wherein the one or more memories store computer-executable instructions, which when executed using the one or more processors, cause the AMD to:
determine second task data indicative of:
a second set of operations, and
one or more conditions,
determine fourth state data associated with the AMD;
determine a second task instance based on the second task data and the fourth state data;
determine a second task element based on the second task instance, wherein the second task element comprises at least a portion of the second set of operations;
determine a first priority value associated with the first metatask element;
determine a second priority value associated with the second task element;
determine fifth state data associated with the AMD;
determine that the fifth state data satisfies the one or more conditions of the second task instance; and
responsive to a determination that the first priority value is greater than the second priority value, operate the AMD, at a third time that is after the first time, based on the second task element.

5. The AMD of claim 1, wherein the one or more memories store computer-executable instructions, which when executed using the one or more processors, cause the AMD to:
determine a second task element, wherein the second task element comprises a second set of operations;
determine a first priority value associated with the first metatask element;
determine a second priority value associated with the second task element;
wherein the first priority value and the second priority value are based on one or more of:
a preassigned value associated with task data associated with an element,
an originator of the task data,
user input,
the task data indicating an interaction with a user, or
duration of operation; and
determine an order of execution of the first metatask element and the second task element based on the first priority value and the second priority value.

6. The AMD of claim 1, wherein state data is indicative of one or more of:
current date,
current time,
presence of a user,
presence of a specified user,
location of the AMD,
operating mode of the AMD indicative of one of: do not disturb, disable sensors, or normal, or
whether the AMD is currently operating based on a task element or a metatask element.

7. The AMD of claim 1, wherein the one or more memories store computer-executable instructions which when executed using the one or more processors, cause the AMD to:
determine second task data indicative of:
a second set of operations,
a second set of non-adaptive conditions, and
a second set of adaptive conditions;
determine fourth state data associated with the AMD;
determine a second task instance based on the second task data and the fourth state data;
determine a second task element based on the second task instance, wherein the second task element comprises at least a portion of the second set of operations;
determine fifth state data associated with the AMD;
determine that the fifth state data satisfies the second set of non-adaptive conditions but does not satisfy the second set of adaptive conditions;

determine a second metatask element based on the second task instance, wherein the second metatask element is associated with the second set of adaptive conditions;
determine that the first set of adaptive conditions are the same as the second set of adaptive conditions; and
operate the AMD after the first time based on the second task element.

8. The AMD of claim 1, the AMD further comprising a communication interface; and
wherein the one or more memories store computer-executable instructions which when executed using the one or more processors, cause the AMD to:
receive, using the communication interface, data that is indicative of use of another device that is associated with the first physical space; and
determine one or more of the first state data or the second state data based on the data.

9. A method comprising:
determining first task data associated with an autonomous mobile device (AMD), the first task data indicative of:
a first set of operations,
a first set of non-adaptive conditions, and
a first set of adaptive conditions;
determining first state data associated with the AMD;
determining a first task instance based on the first task data and the first state data;
determining second state data associated with the AMD;
determining that the second state data satisfies the first set of non-adaptive conditions but does not satisfy the first set of adaptive conditions;
determining a first task element based on the first task instance, wherein the first task element comprises at least a portion of the first set of operations;
determining a first metatask element based on the first task instance, wherein the first metatask element comprises one or more operations that are associated with the first set of adaptive conditions;
responsive to the determining that the second state data satisfies the first set of non-adaptive conditions but does not satisfy the first set of adaptive conditions adding the first metatask element to an adaptive queue;
operating the AMD at a first time based on the first metatask element;
determining third state data associated with the AMD;
determining that the third state data satisfies the first set of adaptive conditions;
responsive to the determining that the third state data satisfies the first set of adaptive conditions, adding the first task element to an active queue; and
operating the AMD at a second time based on the first task element.

10. The method of claim 9, further comprising:
determining, after the first time and before the second time, that the third state data also satisfies the first set of non-adaptive conditions.

11. The method of claim 9, further comprising:
determining second task data indicative of:
a second set of operations, and
one or more conditions;
determining fourth state data associated with the AMD;
determining a second task instance based on the second task data and the fourth state data;
determining a second task element based on the second task instance, wherein the second task element comprises at least a portion of the second set of operations;
determining a first priority value associated with the first metatask element;
determining a second priority value associated with the second task element;
determining fifth state data associated with the AMD;
determining that the fifth state data satisfies the one or more conditions of the second task instance; and
responsive to determining that the first priority value is less than the second priority value, operating the AMD at a third time that is before the first time based on the second task element.

12. The method of claim 9, further comprising:
determining second task data indicative of:
a second set of operations, and
one or more conditions;
determining fourth state data associated with the AMD;
determining a second task instance based on the second task data and the fourth state data;
determining a second task element based on the second task instance, wherein the second task element comprises at least a portion of the second set of operations;
determining a first priority value associated with the first metatask element;
determining a second priority value associated with the second task instance;
determining fifth state data associated with the AMD;
determining that the fifth state data satisfies the one or more conditions of the second task instance; and
responsive to determining that the first priority value is greater than the second priority value, operating the AMD at a third time that is after the first time based on the second task element.

13. The method of claim 9, further comprising:
determining a second task element, wherein the second task element comprises a second set of operations;
determining a first priority value associated with the first metatask element;
determining a second priority value associated with the second task element;
wherein the first priority value and the second priority value are based on one or more of:
a preassigned value associated with an element,
an originator of the task data,
user input,
the task data indicating an interaction with a user, or
duration of operation; and
determining an execution order of the first metatask element and the second task element based on the first priority value and the second priority value.

14. The method of claim 9, wherein state data is indicative of one or more of:
current date,
current time,
presence of a user,
presence of a specified user,
location of the AMD,
operating mode of the AMD indicative of one of do not disturb, disable sensors, or normal, or
whether the AMD is currently operating based on a task element or a metatask element.

15. The method of claim 9, further comprising:
determining second task data indicative of:
a second set of operations,
a second set of non-adaptive conditions, and
a second set of adaptive conditions;
determining fourth state data associated with the AMD;
determining a second task instance based on the second task data and the fourth state data;

determining a second task element based on the second task instance, wherein the second task element comprises at least a portion of the second set of operations;
determining fifth state data associated with the AMD;
determining that the fifth state data satisfies the second set of non-adaptive conditions and does not satisfy the second set of adaptive conditions;
determining a second metatask element based on the second task instance, wherein the second metatask element is associated with the second set of adaptive conditions;
determining that the first set of adaptive conditions are the same as the second set of adaptive conditions; and
operating the AMD after the first time based on the second task element.

16. The method of claim 9, further comprising:
receiving, at the AMD, data that is indicative of use of another device that is associated with the AMD; and
determining one or more of the first state data, the second state data, or the third state data based on the data.

17. A device comprising:
one or more sensors;
one or more processors; and
one or more memories storing computer-executable instructions, which when executed using the one or more processors, cause the device to:
   determine a first task instance indicative of a first set of operations, a first set of non-adaptive conditions, and a first set of adaptive conditions;
   determine first state data associated with the device;
   determine that the first state data satisfies the first set of non-adaptive conditions but does not satisfy the first set of adaptive conditions;
   determine a first task element based on the first task instance, wherein the first task element comprises at least a portion of the first set of operations;
   determine a first metatask element based on the first task instance, wherein the first metatask element comprises one or more operations that are associated with the first set of adaptive conditions;
   add the first metatask element to an adaptive queue;
   operate, at a first time, the device based on the first metatask element;
   determine second state data associated with the device;
   determine that the second state data satisfies the first set of adaptive conditions;
   add the first task element to an active queue; and
   operate, at a second time, the device based on the first task element.

18. The device of claim 17, wherein the one or more memories store computer-executable instructions, which when executed using the one or more processors, cause the AMD to:
determine a second task instance indicative of:
   a second set of operations, and
   one or more conditions;
determine a second task element based on the second task instance, wherein the second task element comprises at least a portion of the second set of operations;
determine a first priority value associated with the first metatask element;
determine a second priority value associated with the second task element;
determine third state data associated with the device;
determine that the third state data satisfies the one or more conditions of the second task element; and
responsive to a determination that the first priority value is less than the second priority value, operate the device at a third time that is before the first time based on the second task element.

19. The device of claim 17, wherein the one or more memories store computer-executable instructions, which when executed using the one or more processors, cause the AMD to:
determine a second task instance indicative of:
   a second set of operations, and
   one or more conditions,
determine a second task element based on the second task instance, wherein the second task element comprises at least a portion of the second set of operations;
determine a first priority value associated with the first metatask element;
determine a second priority value associated with the second task element;
determine third state data associated with the device;
determine that the third state data satisfies the one or more conditions of the second task instance; and
responsive to a determination that the first priority value is greater than the second priority value, operate the device at a third time that is after the first time based on the second task element.

20. The device of claim 17, wherein the one or more memories store computer-executable instructions, which when executed using the one or more processors, cause the AMD to:
determine a second task instance indicative of:
   a second set of operations
   a second set of non-adaptive conditions, and
   a second set of adaptive conditions;
determine a second task element based on the second task instance, wherein the second task element comprises at least a portion of the second set of operations;
determine that the first set of adaptive conditions are the same as the second set of adaptive conditions; and
operate the device after the first time based on the second task element.

* * * * *